(12) United States Patent
van der Maas

(10) Patent No.: US 10,439,816 B2
(45) Date of Patent: Oct. 8, 2019

(54) METHOD FOR PROVISIONING A DEVICE WITH A VERIFIED AND DIVERSIFIED PUBLIC KEY

(71) Applicant: NXP B.V., Eindhoven (NL)

(72) Inventor: Marno Herman Josephus van der Maas, Eindhoven (NL)

(73) Assignee: NXP B.V., Eindhoven (NL)

( * ) Notice: Subject to any disclaimer, the term of this patent is extended or adjusted under 35 U.S.C. 154(b) by 259 days.

(21) Appl. No.: 15/698,880

(22) Filed: Sep. 8, 2017

(65) Prior Publication Data

US 2019/0081791 A1    Mar. 14, 2019

(51) Int. Cl.
| | |
|---|---|
| *H04L 29/06* | (2006.01) |
| *G06F 21/00* | (2013.01) |
| *H04L 9/32* | (2006.01) |
| *G06F 21/72* | (2013.01) |
| *H04L 9/08* | (2006.01) |
| *H04L 9/30* | (2006.01) |
| *H04L 9/14* | (2006.01) |

(52) U.S. Cl.
CPC .......... *H04L 9/3226* (2013.01); *G06F 21/72* (2013.01); *H04L 9/0861* (2013.01); *H04L 9/0866* (2013.01); *H04L 9/0894* (2013.01); *H04L 9/0897* (2013.01); *H04L 9/14* (2013.01); *H04L 9/3066* (2013.01); *H04L 9/3234* (2013.01); *H04L 9/3273* (2013.01); *H04L 2209/805* (2013.01)

(58) Field of Classification Search
CPC ... H04L 9/3226; H04L 9/0866; H04L 9/3273; H04L 9/3234; H04L 9/0897; H04L 9/14; H04L 9/0894; H04L 9/3066; H04L 9/0861; H04L 2209/805; G06F 21/72
See application file for complete search history.

(56) References Cited

U.S. PATENT DOCUMENTS

| | | | |
|---|---|---|---|
| 9,319,224 B2* | 4/2016 | Nemiroff | ................. G09C 1/00 |
| 2010/0088518 A1* | 4/2010 | Dottax | ................. G06Q 20/341 |
| | | | 713/175 |
| 2014/0108787 A1* | 4/2014 | Ando | ................. H04L 63/0823 |
| | | | 713/156 |
| 2016/0171223 A1* | 6/2016 | Covey | ................. G06F 21/572 |
| | | | 713/189 |
| 2019/0052464 A1* | 2/2019 | Doliwa | ................. H04W 4/70 |

FOREIGN PATENT DOCUMENTS

EP              2273718 A1     1/2011

* cited by examiner

*Primary Examiner* — Lisa C Lewis
(74) *Attorney, Agent, or Firm* — Daniel D. Hill

(57) ABSTRACT

A method is provided for generating a public/private key pair on an IC and to provision an IoT device having the IC. In the method, a first entity manufacturers an integrated circuit (IC) for use in a device. The IC, or chip, has a root secret embedded therein. A public key is generated on the IC using a unique identifier (ID) and the root secret. The IC is provided to a second entity for manufacturing the device using the IC. A reference IC is provided to a third entity. The reference IC has the same embedded root secret as the IC. The reference IC is configured to use the unique ID of the IC and the embedded root secret to generate a derived public key. The third entity is enabled to verify that the public key of the IC is associated with the unique ID by using the derived public key of the reference IC. The method allows the IoT device to be provisioned without using a public key infrastructure.

20 Claims, 3 Drawing Sheets

METHOD FOR PROVISIONING A DEVICE WITH A VERIFIED AND DIVERSIFIED PUBLIC KEY

BACKGROUND

Field

This disclosure relates generally to electronic circuits and more specifically to a method for provisioning a device with a verified and diversified public key.

Related Art

An asymmetric encryption system uses a public and private key pair to encrypt and decrypt data. Generating a public and private key pair can be a relatively complex process that requires adequate security measures. Generating the key pair usually involves generating one or more random numbers suitable for cryptographic applications. For ICs used in smartcards, the customer may directly order smartcard ICs to be customized and provided with key material according to their specifications. Trust provisioning services are built on a direct trust relationship between an integrated circuit (IC) manufacturer and the customer who is going to use the produced ICs. The IC manufacturer then configures a key insertion process to provide the right key data to the individual ICs during a wafer testing step of the IC manufacturing process. Afterwards, the keys themselves are provided to the customer (or customer's representative) through a key delivery process. An on-line system may be set up through which the keys can be retrieved.

However, the situation with internet of things (IoT)-related products is quite different than that with smartcards. ICs intended for IoT applications are typically relatively low-cost compared to smartcard ICs. Typically, the ICs used in IoT devices are generic and functionally identical to each other, and the same IC is sold to every customer, where the customer may be an IC distributor. The distributors resell the ICs to the actual customers who integrate them into their IoT product designs. The customer may be an IoT device manufacturer who actually uses contract manufacturers to manufacture the IoT devices. So, there may be no direct contact between the IC manufacturer and the customers who use the ICs, and therefore no direct trust relationship as with smartcards. Because of this business model, the ICs are also not customized for a typical customer.

Sometimes, a public key infrastructure is used to provide a way to provide authentication and verification of devices in secure applications. A third party may provide this service. The use of a public key infrastructure typically requires a continuous internet connection and is costly to maintain.

Generating a key pair on an IC itself may be difficult, especially if the IC would have to perform the key generation in an insecure and uncontrolled environment. Therefore, there is a need for a low cost secure way to generate a verified key pair on the IoT device in an unsecure environment without requiring a costly public key infrastructure.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
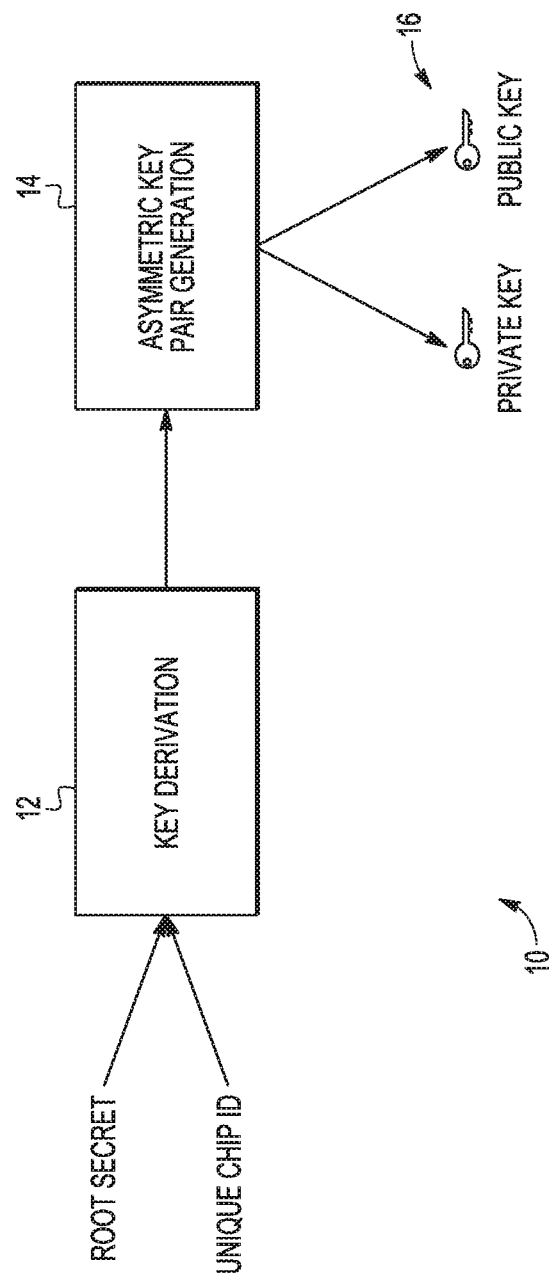
FIG. 1 illustrates a method for generating a public/private key pair for an IoT device in accordance with an embodiment.

Generally, there is provided, a method for generating a public/private key pair for an IoT device. In the method, an IC manufacturer provides an IC to be used in the IoT device. The IC includes one or more hard-coded root secrets and a unique identifier (ID). The hard-coded root secrets are embedded in the IC during wafer testing and are the same for each IC in an IC product family. The root secrets are protected in the ICs from being obtained by attackers. The unique ID is also embedded in the ICs and is not secret. The unique ID is different for each IC. An IC uses the embedded root secret and unique ID to generate public/private key pairs. The ICs are then provided to a device manufacturer. The device manufacturer may outsource the device manufacturing to a contract manufacturer. The IC manufacturer also provides a list of unique IDs that correspond to the ICs provided to the device manufacturer. Also, the IC manufacturer provides a reference IC having the same root secret as the root secret in the ICs provided to make the IoT products. Using the provided unique ID and the embedded root secret of the reference IC, the device manufacturer is enabled to verify public keys of devices manufactured by the contract manufacturer. Verifying a public key verifies whether or not a public key is valid for the device. The device manufacturer uses a server having an authenticated channel to verify the public keys and to provide, for example, proprietary software and data. The server being used for this function is under the control of the device manufacturer. Using this method provides for relatively secure provisioning of IoT devices while avoiding the use of a public key infrastructure for provisioning the ICs.

In accordance with an embodiment, there is provided a method comprising: manufacturing, by a first entity, an integrated circuit (IC) for use in a device, the IC having a root secret embedded therein; generating a public key on the IC using a unique identifier (ID) and the root secret; providing the IC to a second entity for manufacturing the device using the IC; and providing a reference IC to a third entity, the reference IC having the same embedded root secret as the IC, the reference IC configured to use the unique ID and the embedded root secret to generate a derived public key, the third entity enabled to verify that the public key of the IC is associated with the unique ID by using the derived public key of the reference IC. The third entity may verify the public key of the IC using a server to communicate with the IC while the IC is controlled by the second entity. The device may be characterized as being an internet of things (IoT) device. The root secret may be embedded in the IC during a wafer testing phase of the IC. The first entity may be characterized as being an IC manufacturer, the second entity may be characterized as being a contract manufacturer, and the third entity may be characterized as being a device manufacturer, wherein the third entity may contract with the second entity to manufacture the device. The method may further comprise generating a private key on the IC, the private key stored on the IC and kept secret, the private key and the public key together forming an asymmetric key pair. The asymmetric key pair may be characterized as being an elliptic curve cryptography key pair. Every IC of a plurality of ICs may have the same root secret. The method may further comprise: enabling the reference IC to be coupled to a server controlled by the third entity, the server providing an authenticated channel between the reference IC and the device; and comparing the public key of the IC to the derived public key to verify the identity of the IC. The authenticated channel may be provided over an untrusted network.

In another embodiment, there is provided, a method for provisioning a device with a public/private key pair, the method comprising: manufacturing, by a first entity, an integrated circuit (IC) for use in a device, the IC having a root secret embedded therein; generating a private key of the public/private key pair and storing the private key on the IC; generating a public key of the public/private key pair using a unique identifier (ID) and the embedded root secret and storing the public key on the IC; providing the IC to a second entity for manufacturing the device using the IC; and providing a reference IC to a third entity, the reference IC having the same embedded root secret as the IC, the reference IC configured to use the unique ID of the IC and the embedded root secret to generate a derived public key, the third entity enabled to verify that the public key of the IC is associated with the unique ID by using the derived public key of the reference IC, wherein the IC is provisioned when the public key of the IC is verified. The third entity may verify the public key of the IC using a server to communicate with the IC while the IC is under control of the second entity. The device may be characterized as being an internet of things (IoT) device. The root secret may be embedded in the IC during a wafer testing phase of the IC. The first entity may be characterized as being an IC manufacturer, the second entity may be characterized as being a contract manufacturer, and the third entity may be characterized as being a device manufacturer, wherein the third entity may contract with the second entity to manufacture the device. The method may further comprise generating a private key on the IC, the private key stored on the IC and kept secret, the private key and the public key together forming an asymmetric key pair. The public/private key pair may be characterized as being an elliptic curve cryptography key pair. Every IC of a plurality of ICs may have the same root secret. The method may further comprise: enabling the reference IC to be coupled to a server controlled by the third entity, the server providing an authenticated channel between the reference IC and the IC; mutually authenticating the server and the device over the authenticated channel; communicating the unique ID to the server; and comparing the public key of the IC to the derived public key to verify the identity of the IC. The authenticated channel may be provided over an untrusted network.

FIG. 1 illustrates method 10 for generating a public/private key pair for an IoT device in accordance with an embodiment. In IC manufacturing environment 10 a public key is generated in the IC using key derivation function 12. Key derivation function block 12 receives as inputs, a root secret and the unique chip ID. Note, the terms "IC" and "chip" will be used interchangeably. The root secret is the same for a plurality of ICs. For example, a family of ICs may have the same root secret. The root secret is created by an IC manufacturer and may be embedded in the hardware of the IC so that the root secret is not easily attacked and discovered. A unique ID is created by the IC manufacturer that is unique for each of the ICs. The unique ID is not considered secret. However, the unique ID should not be modifiable. An IC must always retain its own unique ID. The unique ID of each IC may be programmed into the IC by blowing fuses, or by storing the unique ID in some other type of one-time programmable (OTP) memory. Asymmetric key pair generation block 14 receives the public key from key derivation function block 12, and generates a corresponding private key. Using a unique ID with the root secret provides diversity to the public/private key pair. Various methods can be used for generating the private key of the key pair. For example, for elliptic curve cryptography, a pseudo random number may be generated and used directly as the private key. For RSA cryptography, two random prime numbers may be generated to create a private key. In both cases the only source of randomness is the output of a key derivation function. Having one source of randomness allows key derivation to be a reproducible process so that the same public and private key pair is always generated for the same unique ID. Together the private key and the public key are asymmetric key pair 16.

Figure 2:
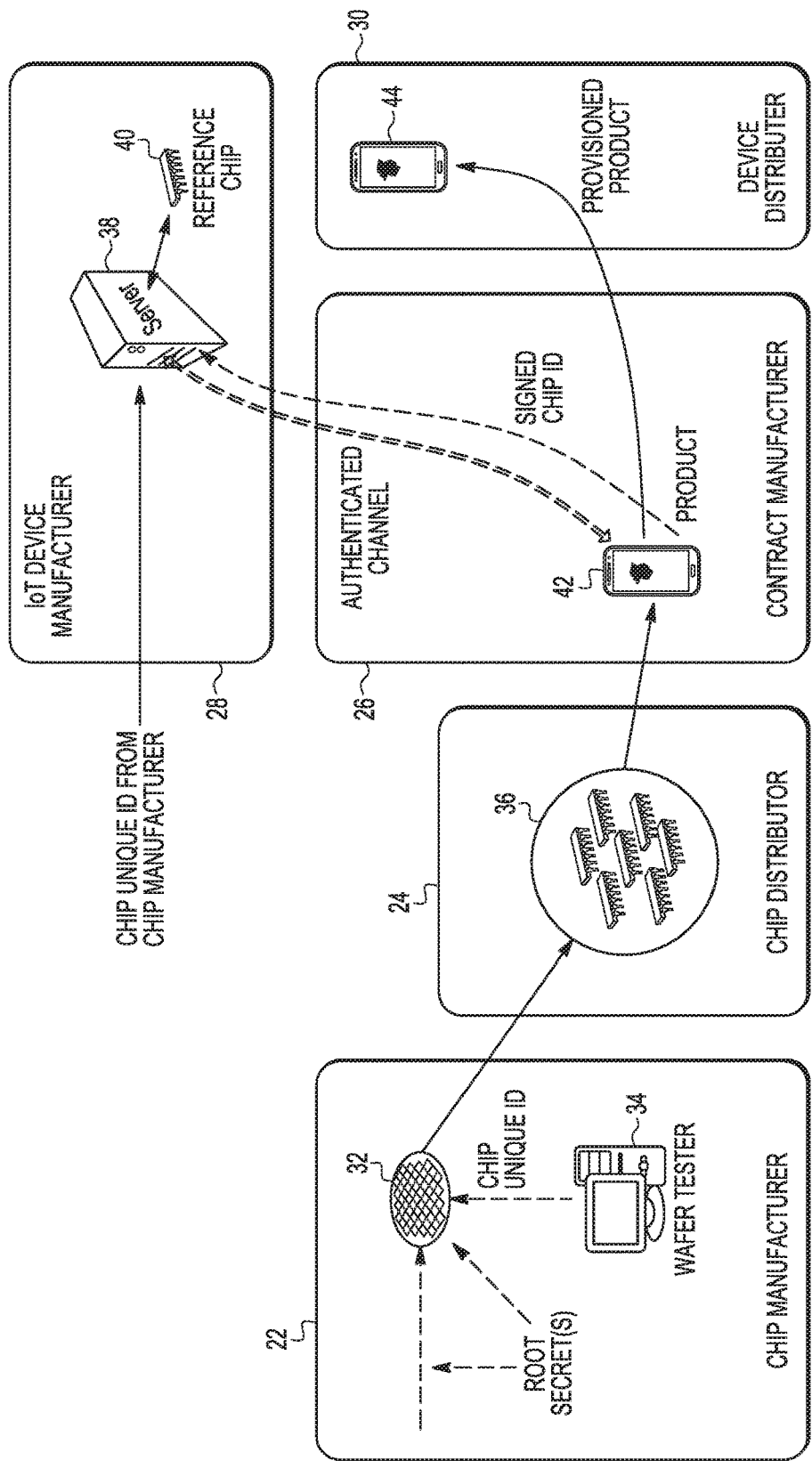
FIG. 2 illustrates a method for provisioning an IoT device in accordance with an embodiment.

FIG. 2 illustrates method 20 for provisioning an IoT device in accordance with an embodiment. Method 20 begins in IC (chip) manufacturing environment 22. In IC manufacturing environment 22, a plurality of ICs (chips) are manufactured. In one embodiment, the root secret and unique IDs are inserted in each of the ICs while they are in a wafer form, such as wafer 32 during wafer testing by wafer tester 34. A public key may be generated in each of the plurality of ICs using the root secret and unique IDs as discussed above in the discussion of FIG. 1. In another embodiment, the public key may be generated by the IC manufacturer and inserted in the die during wafer testing. The IC die are tested while a part of wafer 32 prior to the die being singulated into individual die and packaged to form completed ICs. Generally, wafer testing saves the cost of packaging and final testing die that are defective. The completed ICs are sold and delivered to customers such as distributors and device manufacturers. For example, in FIG. 2, ICs 36 are illustrated in a chip distributor environment 24. The distributors also sell the ICs to device manufacturers. The singulated, packaged, die may be referred to as "chips". As noted above, for this discussion, the terms "IC" and "chip" will be used interchangeably. Generated in this way, neither the customer nor the device manufacturer know the root secret of the private keys in the ICs. Also no other party, such as distributors, other customers of the same type of IC and other external parties, can have access to or gain knowledge of the private keys or root secret. If the customer makes use of contract manufacturing, no secure environment or connection is needed at or to the manufacturing floor.

The ICs 36 are provided to a contract manufacturer by the chip distributor. Alternately, ICs 36 may be provided to the device manufacturer and the device manufacturer then provides ICs 36 to the contract manufacturer. In contract manufacturer environment 26, the contract manufacturer uses the ICs to produce IoT devices (products) that have the ability to access information on the internet. Because the IoT devices can potentially be accessed by others over an unsecure internet connection, protection for the devices is needed. The terms "devices", IoT devices", and "products" will be used interchangeably. Note, it is assumed there is no trust relationship between an IoT device manufacturer and the contract manufacturer.

In FIG. 2, the chip manufacturer provides the unique IDs of ICs 36 to the IoT device manufacturer in IoT device manufacturing environment 28. The unique IDs may be provided using a secure memory such as a smartcard. The unique IDs are loaded into server 38. However, in another embodiment, it is not necessary for the chip manufacturer to provide the unique IDs. An IC will sign its own unique ID and send the unique ID to server 38. Server 38 can then verify that the IC is actually a genuine IC because server 38 can verify that the public key and unique IC match. Server 38 is controlled by the IoT device manufacturer. Reference chip 40 is connected to server 38. Reference chip 40 has the same embedded root secret as ICs 36. However, unlike ICs 36, the unique ID of reference chip 40 is configurable. That is, the unique ID of reference chip 40 can be changed to be any one of the unique IDs loaded in server 38. In one embodiment, this may be accomplished by storing the configurable unique ID in a user programmable memory or register file of reference chip 40.

An authenticated channel is created between server 38 and products 42 after the products, or devices, 42 are manufactured. In one embodiment, the contract manufacturer initiates contact with the server as products 42 are manufactured. IC 36 of each product 42 will calculate its asymmetric key pair 16 as discussed above and illustrated in FIG. 1. The private key will be used to authenticate product 42 with server 38. Then server 38 can verify the public key of product 42 using the corresponding public key derived independently by reference chip 40. Reference chip 40 will use the same or similar process as disclosed in FIG. 1 to derive each public key for each IC from the embedded root secret and each of the provided unique IDs. The derived public key of reference chip 40 is compared with the public key generated by the product 42 being verified. If the public keys match, then the product 42 is verified as being authentic, and the product 42 is provisioned to produce provisioned product 44. After verification, the authenticated channel can be used to distribute software or other information between the device manufacturer and the product 44. Provisioned product 44 may then be provided to the device manufacturer, one or more device distributors such as device distributor 30, or directly to a customer.

Method 20 uses a root secret that is secret to all the entities involved. Also, the root secret is common to all of the ICs. The use of a unique ID with the root secret provides diversity to the public/private key pair. Also, the root secret and the unique ID together allow a private key and public key to be generated that provides good protection for use in an IoT device. In addition, generating the public key in this way allows the public key to be derived by a reference chip that has the same root secret. Yet another advantage is that if one private key leaks from an IC, only that IC is compromised and the rest of the ICs are still secure. No other party, such as distributors, other customers of the same type of IC and other external parties can have access to or gain knowledge of the resulting private keys. Finally, using method 20 allows an IoT device to be provisioned over an untrusted network without using a public key infrastructure, thus reducing manufacturing cost.

Figure 3:
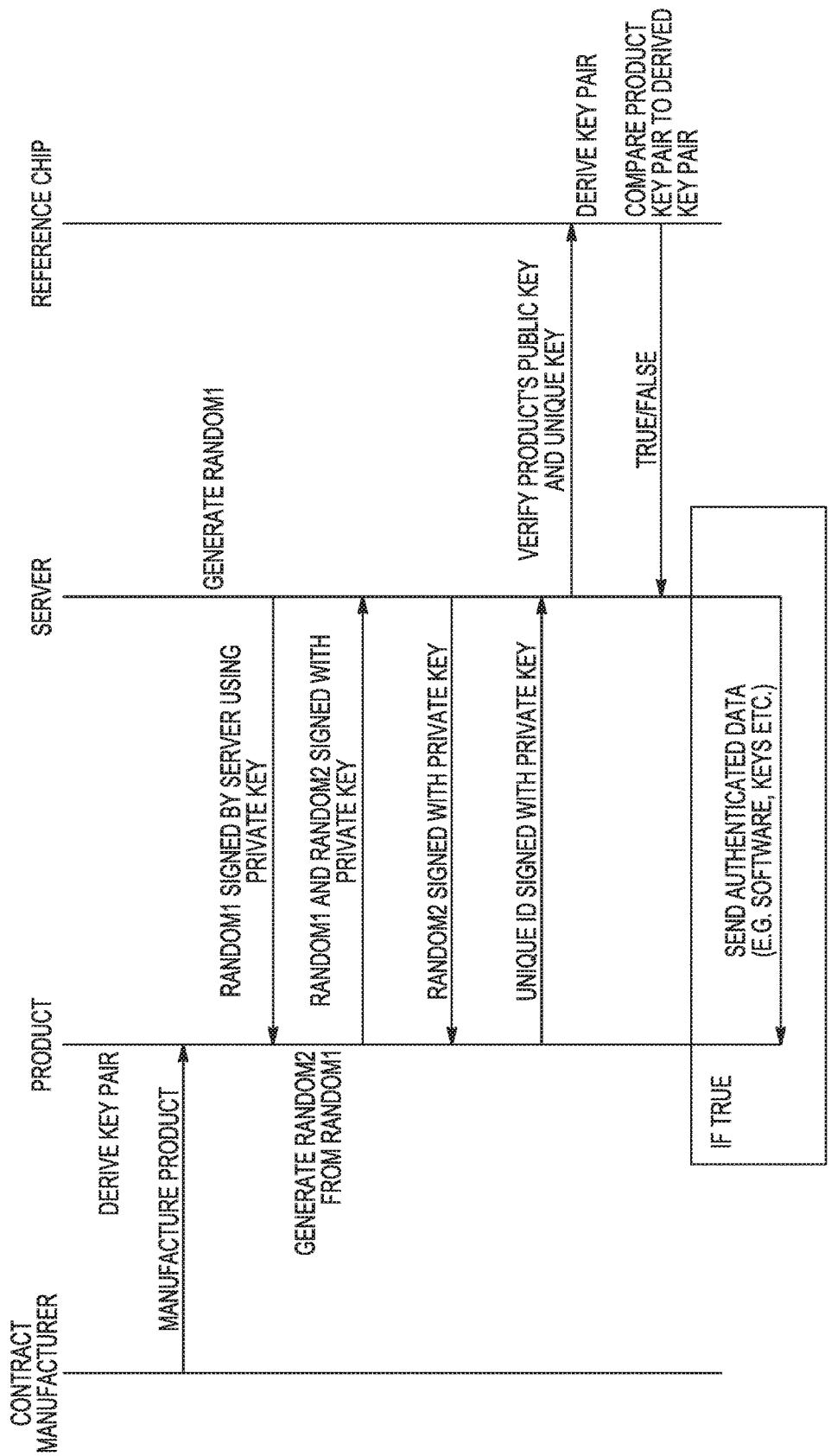
FIG. 3 illustrates a method for provisioning an IoT device in accordance with another embodiment.

FIG. 3 illustrates method 50 for provisioning an IoT device in accordance with another embodiment. In method 50, an IoT device (product) is manufactured by a contract manufacturer using an IC provided by an IC manufacturer. The product is in communication with a server via an authenticated channel. The server may be under the control of a device manufacturer that contracted with the contract manufacturer to manufacture the products. The server is connected to a reference chip. The reference chip may be the same as discussed above in the discussion of FIG. 2. A plurality of ICs having an embedded root secret and unique ID have been provided to a contract manufacturer to use in the manufacture of IoT devices, or products. Each product generates a private key and a public key that are stored on the device. The private key is kept secret to a very high degree but the public key is not kept secret. The reference chip has the same root secret as the plurality of ICs. The reference chip also has a configurable unique ID, where the configurable unique ID can be set, or programmed, to be the same as the unique ID in any of the plurality of ICs. The embedded root secret and unique ID are used to generate a public key as described above and illustrated in FIG. 1. In FIG. 3, the server generates a random number RANDOM 1 and provides the random number to the product over the authenticated channel. The product generates a random number RANDOM 2 derived from RANDOM1 and returns the random numbers RANDOM1 and RANDOM2 and the product public key to the server. The server thus verifies the private key. The use of the random numbers as illustrated is just one way of avoiding replay attacks. Adding steps to guarantee mutual authentication may not be used in other embodiments. The product then signs the unique ID with its private key. The server then uses the reference chip to verify the product's public key by comparing the product's public key with the public key generated in the reference chip. Because the reference chip has the same root secret and the unique ID is configured to be the same as the product being provisioned, the public key derived by the reference chip should be the same as the public key generated by the product. If they do not match, then the product may not be using an authorized IC. The result of the comparison is returned to the server. If the public keys match, the product is judged to be legitimate and the product is then considered provisioned. The authenticated channel can then be used by the device manufacturer to provide other data and software, and the like.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   manufacturing, by a first entity, an integrated circuit (IC) for use in a device, the IC having a root secret embedded therein;
   generating a public key on the IC using a unique identifier (ID) and the root secret;
   providing the IC to a second entity for manufacturing the device using the IC; and
   providing a reference IC to a third entity, the reference IC having the same embedded root secret as the IC, the reference IC configured to use the unique ID and the embedded root secret to generate a derived public key, the third entity enabled to verify that the public key of the IC is associated with the unique ID by using the derived public key of the reference IC.

2. The method of claim 1, wherein the third entity verifies the public key of the IC using a server to communicate with the IC while the IC is controlled by the second entity.

3. The method of claim 1, wherein the device is characterized as being an internet of things (IoT) device.

4. The method of claim 1, wherein the root secret is embedded in the IC during a wafer testing phase of the IC.

5. The method of claim 1, wherein the first entity is characterized as being an IC manufacturer, the second entity is characterized as being a contract manufacturer, and the third entity is characterized as being a device manufacturer, wherein the third entity contracts with the second entity to manufacture the device.

6. The method of claim 1, further comprising generating a private key on the IC, the private key stored on the IC and kept secret, the private key and the public key together forming an asymmetric key pair.

7. The method of claim 6, wherein the asymmetric key pair is characterized as being an elliptic curve cryptography key pair.

8. The method of claim 1, wherein every IC of a plurality of ICs has the same root secret.

9. The method of claim 1, further comprising:
   enabling the reference IC to be coupled to a server controlled by the third entity, the server providing an authenticated channel between the reference IC and the device; and
   comparing the public key of the IC to the derived public key to verify the identity of the IC.

10. The method of claim 8, wherein the authenticated channel is provided over an untrusted network.

11. A method for provisioning a device with a public/private key pair, the method comprising:
    manufacturing, by a first entity, an integrated circuit (IC) for use in a device, the IC having a root secret embedded therein;
    generating a private key of the public/private key pair and storing the private key on the IC;
    generating a public key of the public/private key pair using a unique identifier (ID) and the embedded root secret and storing the public key on the IC;
    providing the IC to a second entity for manufacturing the device using the IC; and
    providing a reference IC to a third entity, the reference IC having the same embedded root secret as the IC, the reference IC configured to use the unique ID of the IC and the embedded root secret to generate a derived public key, the third entity enabled to verify that the public key of the IC is associated with the unique ID by using the derived public key of the reference IC, wherein the IC is provisioned when the public key of the IC is verified.

12. The method of claim 11, wherein the third entity verifies the public key of the IC using a server to communicate with the IC while the IC is under control of the second entity.

13. The method of claim 11, wherein the device is characterized as being an internet of things (IoT) device.

14. The method of claim 11, wherein the root secret is embedded in the IC during a wafer testing phase of the IC.

15. The method of claim 11, wherein the first entity is characterized as being an IC manufacturer, the second entity is characterized as being a contract manufacturer, and the third entity is characterized as being a device manufacturer, wherein the third entity contracts with the second entity to manufacture the device.

16. The method of claim 11, further comprising generating a private key on the IC, the private key stored on the IC and kept secret, the private key and the public key together forming an asymmetric key pair.

17. The method of claim 11, wherein the public/private key pair is characterized as being an elliptic curve cryptography key pair.

18. The method of claim 11, wherein every IC of a plurality of ICs has the same root secret.

19. The method of claim 11, further comprising:
    enabling the reference IC to be coupled to a server controlled by the third entity, the server providing an authenticated channel between the reference IC and the IC;
    mutually authenticating the server and the device over the authenticated channel;
    communicating the unique ID to the server; and
    comparing the public key of the IC to the derived public key to verify the identity of the IC.

20. The method of claim 19, wherein the authenticated channel is provided over an untrusted network.

* * * * *